UNITED STATES PATENT OFFICE.

HARRY C. LOUDENBECK, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

METHOD OF LUBRICATION.

1,129,304.   Specification of Letters Patent.   Patented Feb. 23, 1915.

No Drawing.   Application filed August 1, 1910. Serial No. 575,014.

*To all whom it may concern:*

Be it known that I, HARRY C. LOUDENBECK, a citizen of the United States, residing at Wilkinsburg, in the county of Allegheny and State of Pennsylvania, have invented new and useful Improvements in Methods of Lubrication, of which the following is a specification.

This invention relates to lubrication, and more particularly to a method of lubricating surfaces of slide valves and the like.

While graphite and similar solid lubricants have many desirable qualities in connection with the lubrication of surfaces, difficulty has heretofore been experienced in holding the same on the surface to be lubricated and in maintaining an even distribution of the graphite over the lubricated surface.

Various schemes have been proposed for holding the graphite on the lubricated surface, such as grooving the surface or providing recesses therein which are adapted to be filled with graphite. But these methods are not satisfactory for the reason that the graphite is not evenly distributed over the lubricated surface, and in the case of slide valves, where a tight non-leaking contact between the surfaces is desired, the grooves or recesses break up the smooth surface of the valve and tend to cause leakage.

To obviate the above difficulties is the principal object of my invention and for that purpose the invention contemplates first smoothing the surface in the usual manner and then roughing the same in such manner that the generally level smooth character of the surface is preserved. The graphite or other solid lubricant is then rubbed onto the surface so as to fill the roughness of the surface and thus produce a smooth surface substantially the same as the smooth surface originally provided.

In practising the method of my invention, the smoothed true surface of the valve or other part being provided, said surface is preferably etched with acid to the degree desired. While other ways of finely roughing the surface may be employed within the scope of my invention, the etching process is preferable as a very uniform and even roughing of the surface is thereby produced. Finely divided graphite is then rubbed or otherwise worked into the fine irregularities of the surface until a smooth surface is produced which is substantially as smooth as the original surface. It has been found by tests that the graphite particles hold as a substantially fixed part of the surface under the action of the lubricated parts rubbing together, so that a permanent self lubricating surface is provided.

Having now described my invention, what I claim as new and desire to secure by Letters Patent, is:—

The process of making a self-lubricating bearing surface which consists in first smoothing the bearing surface, then etching the same, and finally filling the etched surface with graphite particles to thereby reproduce the original smooth bearing surface.

In testimony whereof I have hereunto set my hand.

HARRY C. LOUDENBECK.

Witnesses:
 WM. A. CADY,
 A. M. CLEMENTS.